United States Patent [19]
Ladetto et al.

[11] Patent Number: 5,636,884
[45] Date of Patent: Jun. 10, 1997

[54] PIVOTAL SEAT AND SUPPORT

[75] Inventors: Brett G. Ladetto, Clarkston; Earl C. Lucas, Jr., Waterford, both of Mich.

[73] Assignee: Lear Seating Corporation, Southfield, Mich.

[21] Appl. No.: 404,364

[22] Filed: Mar. 15, 1995

[51] Int. Cl.$^6$ ............................................. B60N 2/12
[52] U.S. Cl. .......................... 296/65.1; 297/344.14; 297/344.24
[58] Field of Search .................. 296/64, 65.1, 68, 296/68.1; 297/344.14, 344.15, 344.21, 344.24; 248/425

[56] References Cited

U.S. PATENT DOCUMENTS

| | | | |
|---|---|---|---|
| 2,822,858 | 2/1958 | Mussler. | |
| 3,236,556 | 2/1966 | Lathers | 296/65.1 |
| 4,155,587 | 5/1979 | Mitchell | 296/65.1 |
| 4,341,415 | 7/1982 | Braun et al. | 296/65.1 |
| 4,436,270 | 3/1984 | Muraishi | 296/65.1 |
| 4,792,188 | 12/1988 | Kawashima | 296/65.1 |
| 4,834,452 | 5/1989 | Goodrich | 297/344.24 |
| 5,042,864 | 8/1991 | Mochizuki | 296/65.1 |
| 5,127,699 | 7/1992 | Maezawa et al. | 296/65.1 |

FOREIGN PATENT DOCUMENTS

| | | | |
|---|---|---|---|
| 60-191838 | 9/1985 | Japan | 296/65.1 |
| 4-321443 | 11/1992 | Japan | 297/344.21 |
| 2236476 | 4/1991 | United Kingdom | 296/65.1 |

*Primary Examiner*—Dean Kramer
*Attorney, Agent, or Firm*—Howard & Howard

[57] ABSTRACT

A pivotal support assembly (28) is used to pivot a vehicular seat (26) from an occupant seating position and a loading/unloading position. First (44) and second (46) links pivotally secure a secondary platform (48) to a support platform (24). The first link (44) is longer than the second link (46) to force the front end (50) of the secondary platform (48) closer to the floor (14) of the vehicle (10). A swivel bearing (36) allows the vehicular seat (26) to swivel toward the sliding door (20) to further aid in the passenger entering the vehicle (10) and occupying the vehicular seat (26).

5 Claims, 2 Drawing Sheets

5,636,884

PIVOTAL SEAT AND SUPPORT

BACKGROUND ART

1. Technical Field

The subject invention relates to vehicular seating assembly. More particularly, the subject invention relates to vehicular seating assemblies designed to ease the entry and exit thereof.

2. Description of the Related Art

Van-style vehicles are well suited to transport physically challenged persons. One disadvantage associated with the vans is the height of the floor and seats. More specifically, physically challenged individuals have difficulties in stepping up to the vehicle floor and then rotate into a bench or bucket seat.

U.S. Pat. No. 2,822,858, issued to Mussler on Feb. 11, 1958, discloses a swivel front seat which swivels to aid the passenger in entry and exiting the seat. The seat does not, however, pivot to lower the front portion of the seat cushion to aid the passengers which have difficulty lifting themselves to the height of the seat.

SUMMARY OF THE INVENTION AND ADVANTAGES

The subject invention is a support assembly for supporting a vehicular seat. The support assembly comprises a base securable to a floor of the vehicle. A support platform is rotatably secured to the base. A swivel bearing is secured between the base and support platform for rotating the support platform in a plane substantially parallel to the floor of the vehicle. The support assembly is characterized by pivoting means pivotally secured to the support platform for receiving the vehicular seat and for pivoting the vehicular seat about a pivot axis parallel to the base between an occupant seating position and a loading/unloading position.

The advantage associated with the subject invention includes the ability to lower the front end of the seat cushion to a position just above the floor so that passengers will not have to lift themselves up as far to enter the vehicle and occupy the seat. In addition, the vehicular seat support assembly allows the passengers to dismount the lowered front end of a seat cushion without having to jump to the ground.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
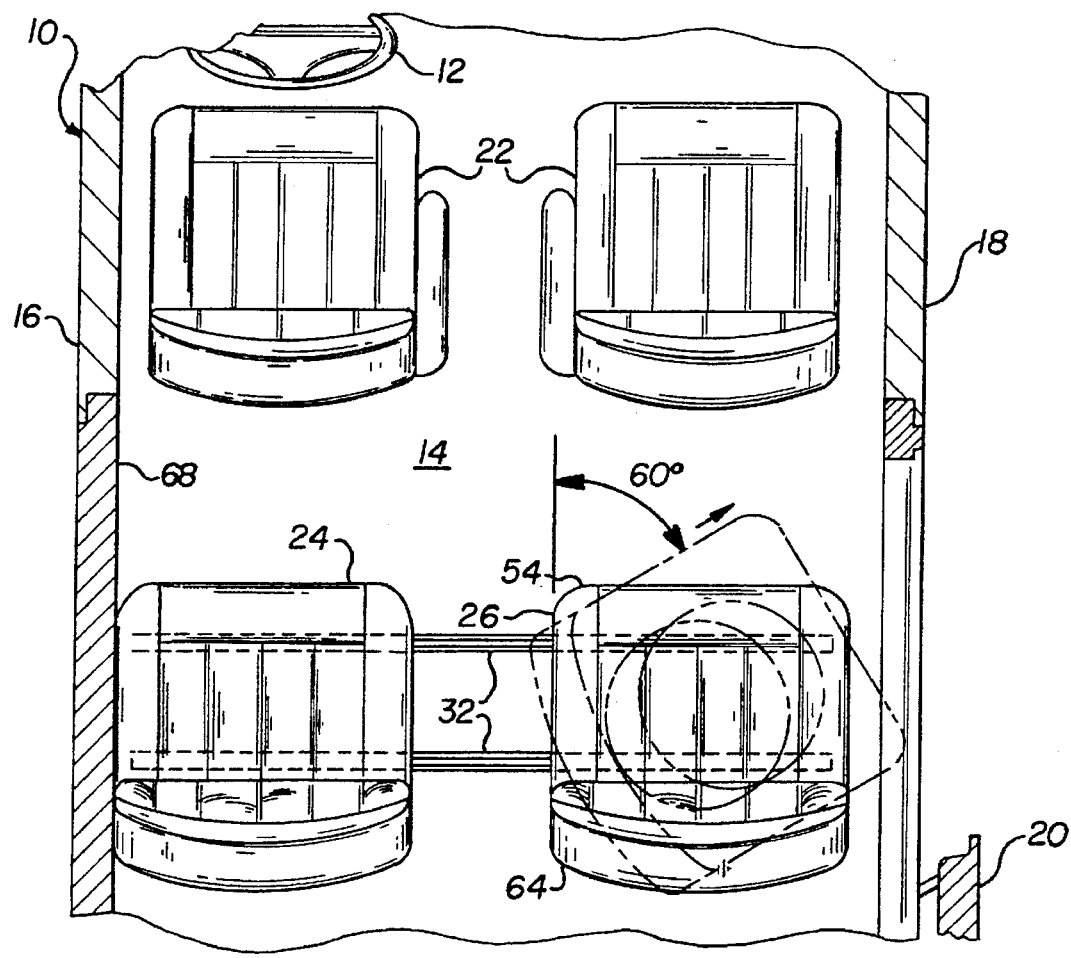
FIG. 1 is a cross sectional top view partially cut away of a vehicle incorporating the preferred embodiment of the subject invention.

Turning to FIG. 1, the top view of a vehicle 10 includes a steering wheel 12, vehicle floor 14, two side doors 16, 18 and a sliding door 20. The vehicle also includes two front seats 22 and two rear seats 24, 26. Although any of the seats 22, 24, 26 may incorporate the subject invention, the second rear seat 26 is shown to include the subject invention.

Figure 2:
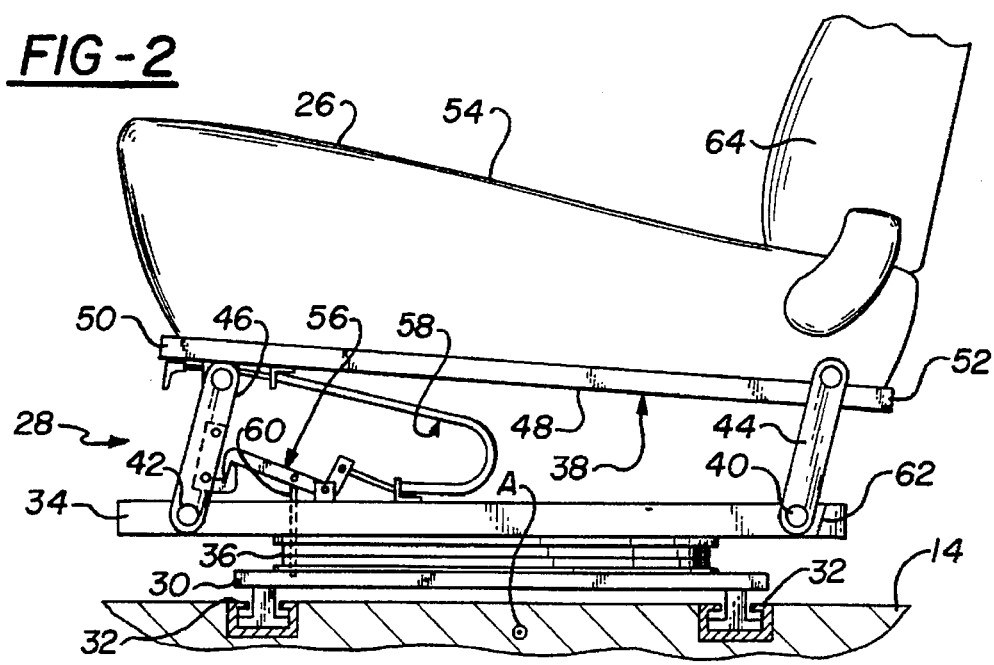
FIG. 2 is a side view of the preferred embodiment of the subject invention in the occupant seating position.
Figure 3:
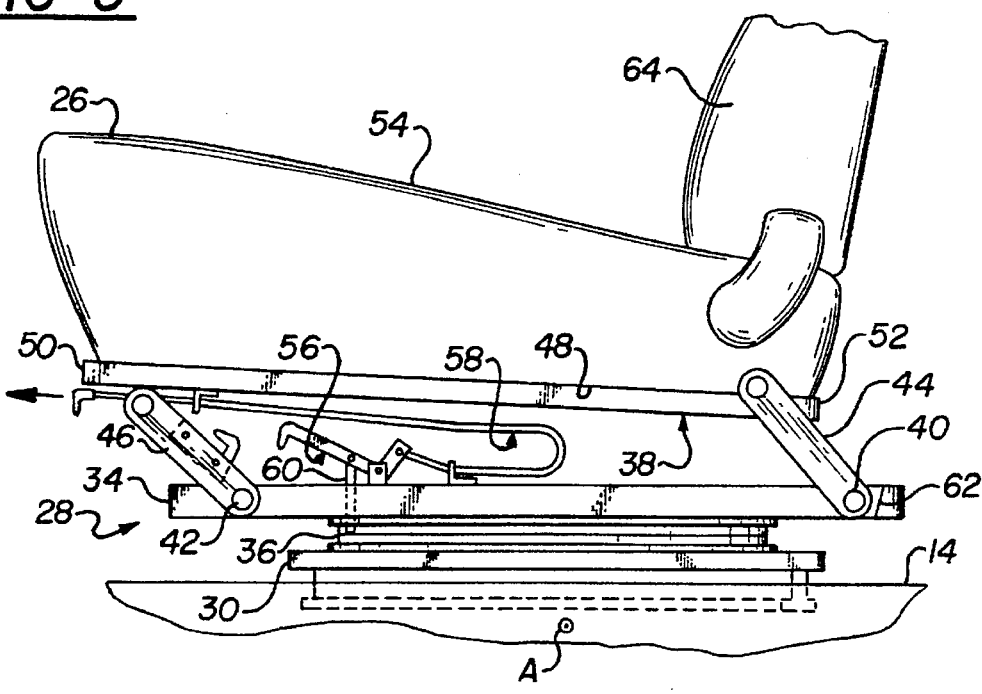
FIG. 3 is a side view of the preferred embodiment of the subject invention shown moving toward the loading/unloading position.
Figure 4:
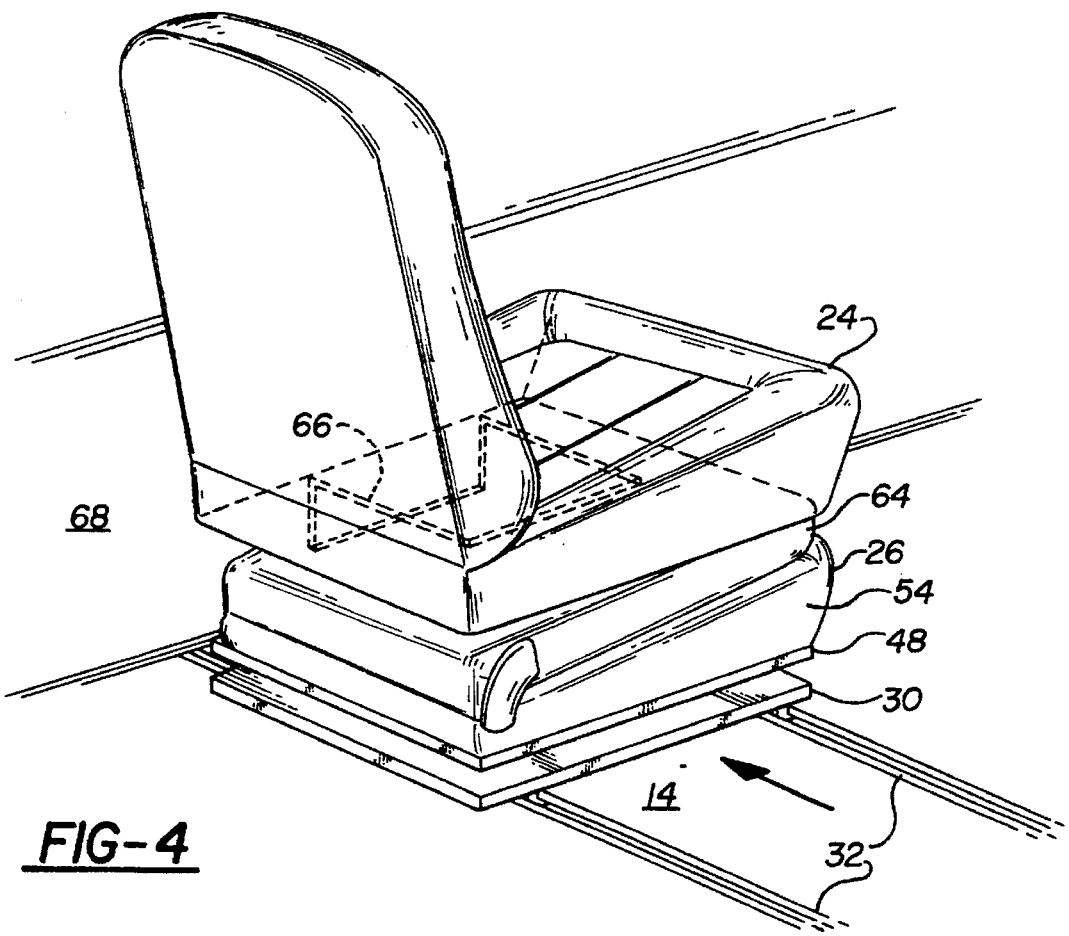
FIG. 4 is a perspective view of the subject invention in the storage position.

Turning to FIGS. 2 and 3, the subject invention, a support assembly, is generally shown at 28. The support assembly 28 includes a base 30 which is securable to the floor 14 of the vehicle 10. The base is movable along a pair of tracks 32 which extend transversely across the vehicle floor 14. The tracks 32 will be discussed in greater detail subsequently.

A support platform 34 is rotatably secured to the base 30. A swivel bearing 36 is secured between the base 30 and the support platform 34. The swivel bearing 36 rotates the support platform 34 in a plane substantially parallel to the floor 14 of the vehicle 10. In the preferred embodiment, the swivel bearing 36 swivels the seat 26 60° toward the sliding door 20. The swivel bearing 36 may comprise a plurality of ball bearings. However, the swivel bearing 36 of the preferred invention includes a single lubricated ring about which the support platform 34 rotates or swivels.

The support assembly 28 is characterized by pivoting means, generally indicated at 38. The pivoting means 38 is pivotally secured to the support platform via pins 40, 42 and links 44, 46. The pivoting means 38 is pivotally secured to the support platform 34 and receives the vehicle seat 26, thereon. The pivoting means 38 pivots the vehicular seat 26 about a pivot axis A which is parallel to the base 30. The pivoting means 38 moves the vehicular seat 26 between an occupant seating position (FIG. 2) and a loading/unloading position (FIG. 3).

The pivoting means 38 includes a secondary platform 48 adapted to secure the vehicular seat 26 thereto. The vehicular seat 26 is attached to the secondary platform 48 via any standard means to fasten two objects together, i.e., bolts, screws, and the like. In other embodiments, the vehicular seat 26 may be removably secured to the pivoting means 38 so that it may be removed when necessary to increase storage space.

The support 34 and second 48 platforms along with the first 44 and second 46 links are pivotally secured together to form a four bar linkage. The first link 44 is longer than the second link 46 which allows the front end 50 of the secondary platform 48 to move closer to the floor 14 then the rear end 52 of the secondary platform 48. To further move the front end 50 closer to the floor 14, the first link 44 is connected to the secondary platform 48 above the second platform whereas the second link 46 is connected to the secondary platform 48 below the secondary platform 48. More specifically, the seat cushion 54 of the vehicular seat 56 pivots to have the front end thereof come closer to the floor 14 then the rear portion of the seat cushion 54 to help facilitate the access of the seat cushion 54 to the passenger.

Locking means, generally indicated at 56 locks the pivoting means 38 in the occupant seating position. Releasing means 58 allows the locking means 56 to be released, thus allowing the pivoting means 38 to move from the seating position to the loading/unloading position. The locking means 56 includes a locking pin 60 which diagrammatically represents the locking of the swivel bearing 36 in a specific position. A separate lever may be used to separately unlock and lock the swivel bearing 36 for the mechanism to unlock the swivel bearing 36 as means for selectively locking and unlocking a bearing such as the swivel bearing 36 is not part of the subject invention and is well known in the prior art.

Stops 62 are located behind the first links 44 to prevent the seat 26 to move back beyond the seat occupant position to an unusable position (further clockwise than what is shown in FIG. 2).

If it is desired to move the vehicular seat 26 out of the way to enhance loading the rear portion of the vehicle 10, the seat may be moved to its loading/unloading position with the backrest cushion 64 folded on the seat cushion 54 and the whole seat 26 and support assembly 28 can be slid along the tracks 32 under another seat 24 which is supported by a brace 66 in a cantilever fashion off the side wall 68 of the vehicle 10. If the profile of the vehicular seat 26 is too wide, the vehicular seat 26 may be removed from the support assembly 28 prior to sliding the support structure 28 under the other vehicular seat 24.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. A vehicular seat assembly comprising:

a first seat (26);

a second seat (24) fixedly secured to a vehicle (10);

a base (30) for removably securing said first seat (26); and a set of tracks (32) fixedly secured to a floor (14) of the vehicle (10), said set of tracks (32) receives said base (30) such that said base (30) moves between a seat occupant seat position and a base storage position, said base (30) being located under said second seat (24) when said base (30) is in said base storage position.

2. A vehicular seat assembly comprising:

a first seat (26);

a second seat (24) fixedly secured to a vehicle (10) adjacent said first seat (26);

a base (30) securable to a floor (14) of a vehicle (10);

a support platform (34) rotatably secured to said base (30);

pivoting means (38) pivotally secured to said support platform (34) for receiving and supporting said first seat (26) and for pivoting said seat (26) about a pivot axis (A) parallel to said base (30) between an occupant seating position spaced above said support platform (34) and a loading/unloading position pivoted downwardly adjacent said support platform (34) and at least partially forward of said platform (34); and a set of tracks (37) fixedly secured to the vehicle floor (14) for receiving said base (30) and providing sliding movement of said base (30) between a seat occupant position adjacent said second seat (24) and a base storage position located under said second seat (24).

3. An assembly as set forth in claim 2 further characterized by said pivoting means (39) including a secondary platform adapted to removably secure said seat (26) above said pivoting means (38) and said support platform (48) in said occupant seating position and said loading/unloading position.

4. An assembly as set forth in claim 3 further characterized by said pivoting means (38) further including first (44) and second (46) links rotatably secured between said support (34) and secondary (48) platforms.

5. An assembly as set forth in claim 4 further characterized by said first link (44) being longer than said second link (46).

* * * * *